United States Patent
Demirtas et al.

(10) Patent No.: US 8,991,004 B2
(45) Date of Patent: Mar. 31, 2015

(54) CYCLONE SEPARATOR FOR A SUCTION CLEANING APPLIANCE AND SUCTION CLEANING APPLIANCE WITH A CYCLONE SEPARATOR

(71) Applicant: Alfred Kärcher GmbH & Co. KG, Winnenden (DE)

(72) Inventors: Yunus Demirtas, Kornwestheim (DE); Juergen Gassmann, Schwaikheim (DE); Ronald Schwarz, Winnenden (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 35 days.

(21) Appl. No.: 14/017,437

(22) Filed: Sep. 4, 2013

(65) Prior Publication Data

US 2014/0000060 A1 Jan. 2, 2014

Related U.S. Application Data

(63) Continuation of application No. PCT/EP2011/053729, filed on Mar. 11, 2011.

(51) Int. Cl.
| | |
|---|---|
| *A47L 9/16* | (2006.01) |
| *A47L 7/00* | (2006.01) |
| *A47L 11/34* | (2006.01) |
| *A47L 11/40* | (2006.01) |

(Continued)

(52) U.S. Cl.
CPC .............. *A47L 9/1608* (2013.01); *A47L 7/0023* (2013.01); *A47L 9/1658* (2013.01); *A47L 9/1683* (2013.01); *A47L 11/34* (2013.01); *A47L 11/4016* (2013.01); *A47L 11/4027* (2013.01); *B01D 45/12* (2013.01); *B04C 5/103* (2013.01); *B04C 5/13* (2013.01)

USPC ................................................ 15/353; 15/347

(58) Field of Classification Search
USPC .............. 15/353, 352, 347, 350; 55/447, 410, 55/413, 337, DIG. 3
See application file for complete search history.

(56) References Cited

U.S. PATENT DOCUMENTS 4,668,256 A * 5/1987 Billiet et al. ..................... 96/409
6,475,256 B2 * 11/2002 Matsubara et al. ............. 55/337
(Continued)

FOREIGN PATENT DOCUMENTS

| CA | 2 411 936 | 11/2003 |
|---|---|---|
| DE | 294 642 | 10/1991 |

(Continued)

*Primary Examiner* — Dung Van Nguyen
(74) *Attorney, Agent, or Firm* — Womble Carlyle Sandridge & Rice, LLP

(57) ABSTRACT

A cyclone separator for a suction cleaning appliance is provided, including a separating container for separating cleaning liquid drawn in by suction, with an inlet through which suction air and cleaning liquid can be drawn by suction into an interior of the separating container, thereby forming a cyclone, a suction extraction line extending into the interior and connectable to a suction unit, with an outlet through which suction air can be drawn out of the interior, and a partition wall shielding the outlet from cleaning liquid, a space being provided between an inner wall of the separating container and the partition wall. The cyclone separator can include at least one transfer element arranged between the partition wall and the inner wall for transferring cleaning liquid from the partition wall to the inner wall, the transfer element bridging the space except for a maximum remaining space of 2 millimeters.

23 Claims, 9 Drawing Sheets

(51) Int. Cl.
 *B01D 45/12* (2006.01)
 *B04C 5/103* (2006.01)
 *B04C 5/13* (2006.01)

(56) References Cited

U.S. PATENT DOCUMENTS

| | | | |
|---|---|---|---|
| 7,128,770 B2 * | 10/2006 | Oh et al. | 55/343 |
| 7,341,611 B2 * | 3/2008 | Greene et al. | 55/337 |
| 7,559,963 B2 * | 7/2009 | Oh et al. | 55/337 |

FOREIGN PATENT DOCUMENTS

| | | |
|---|---|---|
| DE | 10 2008 013 485 | 11/2009 |
| EP | 1 535 560 | 1/2005 |
| EP | 1 736 089 | 12/2006 |
| GB | 2 341 124 | 3/2000 |
| JP | 2005-211350 | 8/2005 |
| WO | WO 2006/102147 | 9/2006 |

* cited by examiner

CYCLONE SEPARATOR FOR A SUCTION CLEANING APPLIANCE AND SUCTION CLEANING APPLIANCE WITH A CYCLONE SEPARATOR

CROSS-REFERENCE TO RELATED APPLICATIONS

This application is a continuation of international application number PCT/EP2011/053729, filed on Mar. 11, 2011, which is incorporated herein by reference in its entirety and for all purposes.

FIELD OF THE INVENTION

The present invention relates to a cyclone separator for a suction cleaning appliance, in particular, for a spray extraction appliance or a wet vacuum cleaner, the cyclone separator comprising a separating container for separating cleaning liquid drawn in by suction, with an inlet through which suction air and cleaning liquid can be drawn by suction into an interior of the separating container, thereby forming a cyclone, a suction extraction line extending into the interior and connectable to a suction unit, with an outlet through which suction air can be drawn out of the interior, and a partition wall shielding the outlet from cleaning liquid, a space being provided between an inner wall of the separating container and the partition wall.

The present invention also relates to a suction cleaning appliance.

BACKGROUND OF THE INVENTION

A cyclone separator of the kind mentioned at the outset is used in a suction cleaning appliance, in particular, a spray extraction appliance or a wet vacuum cleaner to separate the mixture of dirty cleaning liquid and suction air from each other. For this purpose, the mixture usually flows tangentially into the separating container, which is usually of cylindrical configuration, so that an annular flow forms in its interior. Owing to the suction extraction line extending into the interior, via which the interior can be subjected to negative pressure, the annular flow runs helically or spirally and, for this reason, is referred to as cyclone. Under the centrifugal action of the cyclone, cleaning liquid and dirt particles contained therein are hurled against the inner wall of the separating container. Under the influence of a wall boundary layer flow forming at the inner wall and under the influence of gravity, the cleaning liquid with the dirt particles can flow into a reservoir at the bottom of the separating container. The reservoir can be divided off from the remaining interior of the separating container by a partition wall provided with openings, for example, an intermediate bottom, in order to prevent separated cleaning liquid from being drawn by suction out of the reservoir. In order that cleaning liquid which has been drawn by suction into the interior will not be drawn out directly by suction through the outlet, the partition wall is provided in the direct direction of flow from the inlet to the outlet. The partition wall usually surrounds the outlet cylindrically, and the cyclone forms between the partition wall and the inner wall.

It may, however, happen that drops of liquid collect on the partition wall or a film of cleaning liquid forms on the partition wall. This is, for example, due to a short circuit of the flow in the separating container owing to back-up of the flow with a fluctuating charge of cleaning liquid or a fluctuating opening cross section of a connected suction nozzle, as a result of which the pressure conditions change in the separating container. Furthermore, wall friction of the mixture of cleaning liquid and suction air results in a boundary layer flow, the so-called "lid boundary layer flow", which may form across a cover wall of the separating container up to the partition wall. This, in turn, results in a flow occurring around the free rim of the partition wall. Consequently, owing to the suction action exceeding the centrifugal force, liquid droplets are not separated off in spite of the presence of the partition wall, but are drawn off by suction through the outlet. To avoid this known problem, EP 1 736 089 A2 proposes configuring the partition wall in the shape of a bell and at the same time providing at the free rim a lateral window of approximately 90° in the circumferential direction of the suction extraction line. Such a construction of the partition wall is to enable the cleaning liquid to flow around the free rim of the partition wall in the direction of the suction extraction line, but then to rotate as a result of the cyclone and to be discharged through the window tangentially onto the inner wall. However, the cyclone separator described in EP 1 736 089 A2 is of relatively complicated construction and not inconsiderable size.

A further cyclone separator of the kind mentioned at the outset is described in EP 1 535 560 A2.

An object underlying the present invention is to provide a generic cyclone separator with which cleaning liquid can be reliably separated, while achieving a compact construction.

SUMMARY OF THE INVENTION

In a first aspect of the invention, a cyclone separator for a suction cleaning appliance, in particular, for a spray extraction appliance or a wet vacuum cleaner, comprises a separating container for separating cleaning liquid drawn in by suction, with an inlet through which suction air and cleaning liquid can be drawn by suction into an interior of the separating container, thereby forming a cyclone, a suction extraction line extending into the interior and connectable to a suction unit, with an outlet through which suction air can be drawn out of the interior, and a partition wall shielding the outlet from cleaning liquid, a space being provided between an inner wall of the separating container and the partition wall. The cyclone separator comprises at least one transfer element arranged between the partition wall and the inner wall for transferring cleaning liquid from the partition wall to the inner wall, the transfer element bridging the space between the partition wall and the inner wall except for a maximum remaining space of 2 millimeters.

In a second aspect of the invention, a suction cleaning appliance comprises at least one cyclone separator. The cyclone separator comprises a separating container for separating cleaning liquid drawn in by suction, with an inlet through which suction air and cleaning liquid can be drawn by suction into an interior of the separating container, thereby forming a cyclone, a suction extraction line extending into the interior and connectable to a suction unit, with an outlet through which suction air can be drawn out of the interior, and a partition wall shielding the outlet from cleaning liquid, a space being provided between an inner wall of the separating container and the partition wall. The cyclone separator comprises at least one transfer element arranged between the partition wall and the inner wall for transferring cleaning liquid from the partition wall to the inner wall, the transfer element bridging the space between the partition wall and the inner wall except for a maximum remaining space of 2 millimeters.

BRIEF DESCRIPTION OF THE DRAWING FIGURES

The foregoing summary and the following description may be better understood in conjunction with the drawing figures, of which:

DETAILED DESCRIPTION OF THE INVENTION

Figure 1:
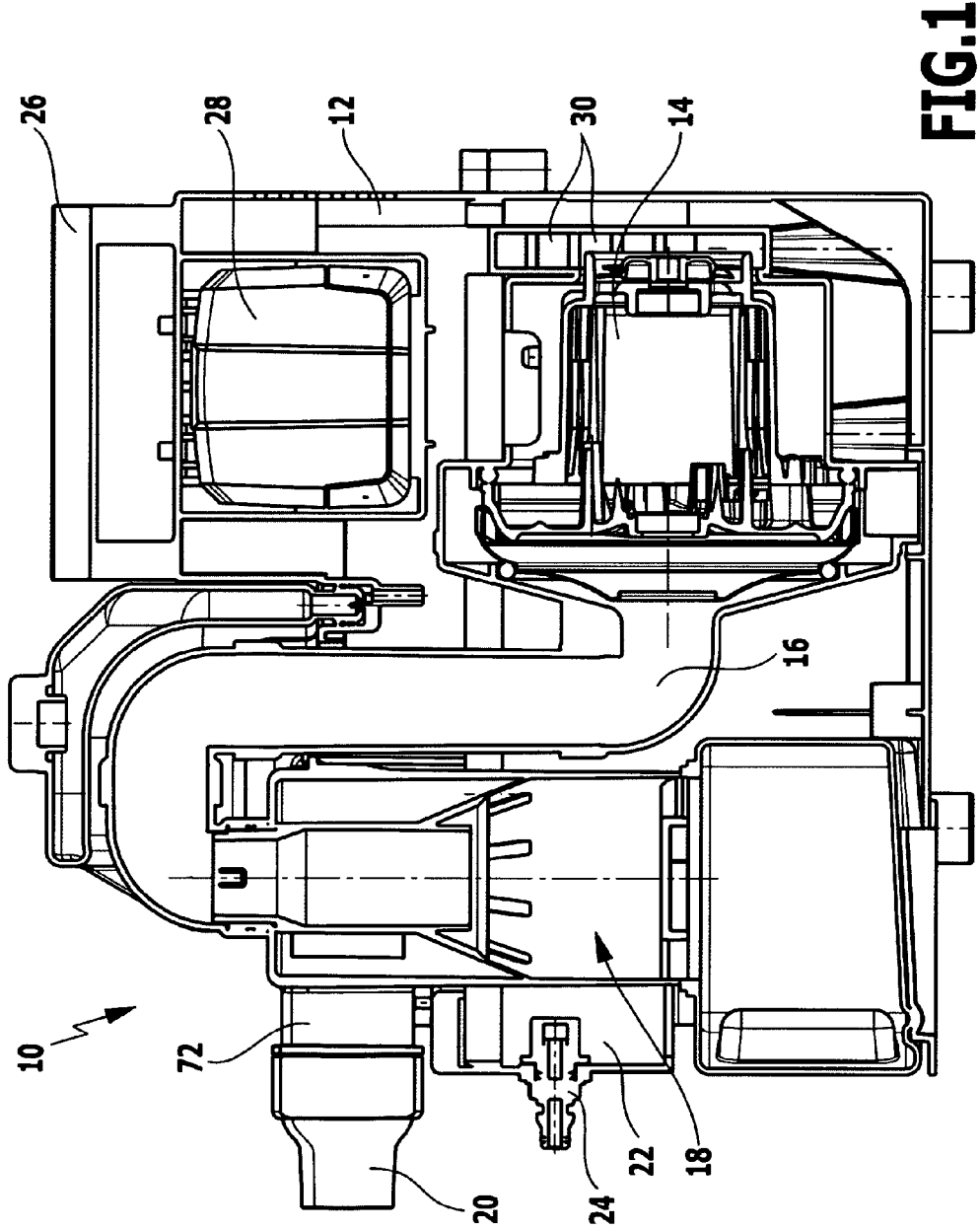
FIG. 1 shows a sectional view of a suction cleaning appliance in accordance with the invention, comprising a first preferred embodiment of a cyclone separator in accordance with the invention.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a cyclone separator for a suction cleaning appliance, in particular, for a spray extraction appliance or a wet vacuum cleaner, the cyclone separator comprising a separating container for separating cleaning liquid drawn in by suction, with an inlet through which suction air and cleaning liquid can be drawn by suction into an interior of the separating container, thereby forming a cyclone, a suction extraction line extending into the interior and connectable to a suction unit, with an outlet through which suction air can be drawn out of the interior, and a partition wall shielding the outlet from cleaning liquid, a space being provided between an inner wall of the separating container and the partition wall. The cyclone separator comprises at least one transfer element arranged between the partition wall and the inner wall for transferring cleaning liquid from the partition wall to the inner wall, the transfer element bridging the space between the partition wall and the inner wall except for a maximum remaining space of 2 millimeters.

With the cyclone separator in accordance with the invention, it is possible to conduct cleaning liquid in a targeted manner from the partition wall to the inner wall of the separating container, i.e., to transfer it from the partition wall to the wall boundary layer flow at the inner wall. For this purpose, the cyclone separator provides at least one transfer element, with which the space between the partition wall and the inner wall can be bridged almost completely or even completely. In practice, it has proven sufficient for transferring cleaning liquid to the inner wall if the remaining space between the at least one transfer element and the inner wall and/or between the at least one transfer element and the partition wall is, all in all, at maximum 2 millimeters. With such a size of the remaining space, liquid droplets can still be conducted from the partition wall to the at least one transfer element and from it to the inner wall. The at least one transfer element is preferably spatially delimited in the circumferential direction of the partition wall in order that cleaning liquid which is hurled against the inner wall under the centrifugal action of the cyclone can also flow along the inner wall to the reservoir of cleaning liquid.

In practice, it is found that the bridging of the space in the area of the at least one transfer element to the maximum remaining space of 2 millimeters also functions with common operating parameters of a suction cleaning appliance comprising the cyclone separator. Even with strongly fluctuating airflow rates through the cyclone separator of 0 to approximately 16 liters per second, cleaning liquid flow rates of approximately 0.5 to approximately 1 kilogram per minute, also with high charge and surge-type transportation, and with use of foaming cleaning liquid additives, it can be ensured that cleaning liquid will be reliably conducted from the partition wall to the inner wall. Owing to the targeted transfer of the cleaning liquid, a compact construction of the cyclone separator is also made possible. The aforementioned operating parameters were obtained with a cyclone separator with a diameter of the partition wall at the free rim of approximately 60 millimeters, with a diameter of the separating container of approximately 70 millimeters. The resulting compact cyclone separator is suited, in particular, for use in portable suction cleaning appliances, specifically a portable spray extraction appliance.

It is expedient if the partition wall is a wall of the suction extraction line. This simplifies the construction of the cyclone separator. There is no need to provide a separate partition wall surrounding the suction extraction line, which, at the same time, also makes a more compact design of the cyclone separator possible.

The at least one transfer element preferably bridges the space except for a remaining space of less than 2 millimeters, in particular, less than 1 millimeter and specifically less than 0.5 millimeters. The cleaning liquid can be conducted to the inner wall in an improved manner by further reduction of the remaining space.

It is particularly advantageous if the at least one transfer element bridges the space completely. In this case, the remaining space is zero, which makes it possible to conduct cleaning liquid away particularly well.

The at least one transfer element, in particular, for constructionally simple implementation of the aforementioned embodiment, expediently comprises at least one contact member for contacting the partition wall and/or the inner wall. A contact is thereby established between the at least one transfer element and the partition wall and/or the inner wall, so that cleaning liquid can be effectively conducted away to the at least one transfer element and/or to the inner wall.

The at least one contact member is preferably a contact surface. This enables surface-to-surface contact between the at least one transfer element and the partition wall and/or the inner wall and makes it possible for cleaning liquid to be conducted away particularly reliably.

It is of advantage if the at least one transfer element is of strip-shaped configuration, its dimensions in the circumferential direction of the partition wall being smaller than in the direction of transfer of cleaning liquid from the partition wall to the inner wall. Dirt particles can thereby be largely prevented from sticking to the at least one transfer element. In practice, it is, in fact, found that even hair or fluff only gets caught to a slight extent on the at least one transfer element. Furthermore, the cyclone is affected as little as possible.

In a concrete implementation of the cyclone separator in practice, it may be provided that the at least one transfer element of strip-shaped configuration covers in the circumferential direction of the partition wall, in relation to its end facing the inner wall, an angle of approximately 5° to approximately 20°, in particular, of approximately 10°.

It may be provided that the at least one transfer element is of straight-lined configuration, for example, straight-lined and strip-shaped.

In a different embodiment of the cyclone separator in accordance with the invention, it may be provided that the at least one transfer element has a curvature in the direction of flow of the cyclone. The drops of liquid conducted from the partition wall to the at least one transfer element are subjected to the twist effect of the cyclone. Owing to curvature of the at least one transfer element in the direction of flow of the cyclone, the likelihood of cleaning liquid droplets becoming detached from the at least one transfer element while they flow from the partition wall to the inner wall and possibly being drawn off directly by suction through the outlet is reduced. This makes it possible for cleaning liquid to be conducted even more reliably to the inner wall.

It has proven advantageous if the at least one transfer element comprises at least one groove, which, in particular, starting from the partition wall, runs in the direction of the inner wall. Cleaning liquid droplets may collect in the at least one groove at the partition wall end and be conducted through the groove, which, as it were, forms a flow channel for the cleaning liquid, in a targeted manner to the inner wall.

In particular, when the at least one transfer element, as mentioned hereinabove, is of strip-shaped configuration, it has proven advantageous if the cyclone separator comprises a plurality of transfer elements. For example, it may be provided that the cyclone separator comprises approximately 5 to approximately 15 transfer elements, in particular, approximately 10 transfer elements. The transfer elements are each spatially delimited in the circumferential direction of the partition wall. This allows spaces to be provided between adjacent transfer elements, through which cleaning liquid which has been separated under the centrifugal force of the cyclone onto the inner wall can flow to the cleaning liquid reservoir.

It is expedient if the transfer elements are of identical configuration as this simplifies the construction of the cyclone separator. Furthermore, this is beneficial for a homogenous suction flow in the cyclone. This, in turn, has a favorable effect on reliable operation of the cyclone separator.

The transfer elements are preferably uniformly spaced from one another in the circumferential direction of the partition wall so that as homogeneous a suction flow as possible can be achieved in the cyclone and, in addition, cleaning liquid can be uniformly conducted from the partition wall to the inner wall.

The at least one transfer element is advantageously fixed to the partition wall and, therefore, in particular, to the suction extraction line if the partition wall is preferably a wall of the suction extraction line. A constructionally simple configuration of the cyclone separator can thereby be achieved. The at least one transfer element extends from the partition wall in the direction of the inner wall, from which its free end is spaced at maximum 2 millimeters. At the free end, the at least one transfer element may comprise a contact member for contacting the inner wall, so that the remaining space even disappears and cleaning liquid can be conducted away particularly reliably.

In a constructionally particularly simple configuration of the cyclone separator, the at least one transfer element is formed integrally with the partition wall or a part thereof.

It is of advantage if the at least one transfer element is fixed to a free rim of the partition wall. As mentioned, cleaning liquid flows under the influence of the boundary layer flow and the twist effect of the cyclone along the partition wall up to its free rim. At the free rim, cleaning liquid can contact the at least one transfer element and be conducted away in the direction of the inner wall.

The partition wall may have, specifically at the free rim, a recess extending at least partially in the circumferential direction, for example, a groove. Cleaning liquid to be conducted away can be collected in the recess and, for example, passed on to a transfer element fixed to the free rim.

It is expedient if the partition wall comprises or forms a shield which widens in its circumference in the direction in which the suction extraction line extends into the interior. As a result of the widening shield, the flow velocity of the mixture of suction air and cleaning liquid increases all the more, the more the shield widens. Increasing the flow velocity causes the centrifugal force on the cleaning liquid to increase, with the result that it can be separated off more effectively onto the inner wall. Also cleaning liquid adhering to the partition wall can be caught by the cyclone owing to its higher flow velocity and conveyed to the inner wall. The amount of cleaning liquid remaining on the partition wall is thereby reducible. This remaining amount of cleaning liquid can be conducted in a targeted manner by the at least one transfer element to the inner wall.

In particular, the suction extraction line comprises the shield if the partition wall is a wall of the suction extraction line.

The at least one transfer element is advantageously configured so as to extend as an extension of the shield in the direction of the inner wall. As has been found in practice, a disturbing influence of the at least one transfer element on the cyclone can thereby be substantially avoided. In particular, the at least one transfer element extends as a preferably straight-lined extension of the shield in the direction of the inner wall.

It has proven advantageous for the at least one transfer element to be arranged on a side of the shield that faces the inlet, in particular, on an upper side of the shield, as, in practice, the inlet is typically formed on the upper side of the separating container. Cleaning liquid collects on the side of the shield that faces the inlet. Arranged on this side, the at least one transfer element may, for example, form an edge which, as it were, can "catch" the cleaning liquid droplets.

In a further advantageous embodiment of the cyclone separator in accordance with the invention, it may be provided that the at least one transfer element is fixed to the inner wall. Starting from the inner wall, the at least one transfer element extends in the direction of the partition wall, in particular, in the direction of a wall of the suction extraction line. The remaining space between the at least one transfer element and the partition wall is at maximum 2 millimeters and preferably disappears altogether if the at least one transfer element comprises a contact member contacting the partition wall.

For a constructionally particularly simple configuration, it is of advantage if the at least one transfer element is formed integrally with the inner wall.

The cyclone separator preferably comprises a holder for the at least one transfer element, the holder forming a section of the inner wall and being releasably insertable into the separating container. This facilitates cleaning of the cyclone separator. The holder to which the at least one transfer element is fixed can be released from the separating container, freed from dirt particles and then inserted into the separating container again. Assembly of the cyclone separator is also easier.

To achieve a constructionally simple configuration of the cyclone separator, it is of advantage if the at least one transfer element is formed integrally with the holder.

The holder is, for example, a holding ring or comprises such a holding ring, to which the at least one transfer element is fixed and from which it protrudes in the direction of the partition wall. A step with a ledge protruding in the direction of the interior for receiving the holding ring may, for example, be arranged on the inner wall. A wall of the holder that faces the center of the interior may form a section of the inner wall of the separating container to which the cleaning liquid is conducted.

As mentioned at the outset, the invention also relates to a suction cleaning appliance. The object underlying the invention is to provide a suction cleaning appliance with a cyclone separator with which cleaning liquid can be reliably separated, while achieving a compact construction.

This object is accomplished by a suction cleaning appliance comprising at least one cyclone separator of the kind explained hereinabove.

The advantages mentioned in connection with the explanation of the cyclone separator in accordance with the invention and the advantages mentioned in connection with the explanation of advantageous embodiments of the cyclone separator in accordance with the invention can be achieved with the suction cleaning appliance in accordance with the invention. Reference is made to the above explanations with regard to these advantages.

The suction cleaning appliance in accordance with the invention is, in particular, a spray extraction appliance; however, it may also be a wet vacuum cleaner. Owing to the compact construction, the cyclone separator may be used, in particular, in a portable suction cleaning appliance.

FIG. 1 shows a sectional representation of a preferred embodiment of a suction cleaning appliance in accordance with the invention, which is denoted by reference numeral 10 and is configured as a portable spray extraction appliance.

The suction cleaning appliance 10 comprises a housing 12 in which a suction unit 14 is accommodated. A suction channel 16 can be subjected to negative pressure by the suction unit 14 in order to draw off suction air from a cyclone separator 18 which will be explained hereinbelow. At the inlet side, the suction cleaning appliance 10 comprises a nozzle-shaped connection element 20 for a suction hose, not shown in the drawings, at the other end of which a floor nozzle is arranged for cleaning a floor surface.

The floor nozzle can be supplied with a cleaning liquid stored in a tank 22 of the suction cleaning appliance via a supply hose, likewise not shown in the drawings. The cleaning liquid is water which usually has a cleaning additive added to it in order to increase the cleaning effect. The supply hose, not shown, is connected to a valve 24 which seals the tank 22.

As mentioned, the suction cleaning appliance 10 is portable during normal operation, a handle 26 formed on the housing 12 being provided for this purpose. A rechargeable battery 28 accommodated in the housing 12 serves to supply the suction unit 14 with energy.

Indications relating to location and direction such as "at the top", "at the bottom" or the like are to be understood hereinbelow in relation to a position of use of the suction cleaning appliance 10 as represented in FIG. 1.

When the suction cleaning appliance 10 is in operation, the floor nozzle is supplied with cleaning liquid via the supply hose connected to the valve 24. Under the action of the suction unit 14, the mixture of cleaning liquid and detached dirt is drawn by suction through the suction hose into the cyclone separator 18 in which the cleaning liquid is separated from the suction air as explained hereinbelow. The suction air is drawn off further through the suction channel 16 and leaves the housing 12 through openings 30.

Figure 2:
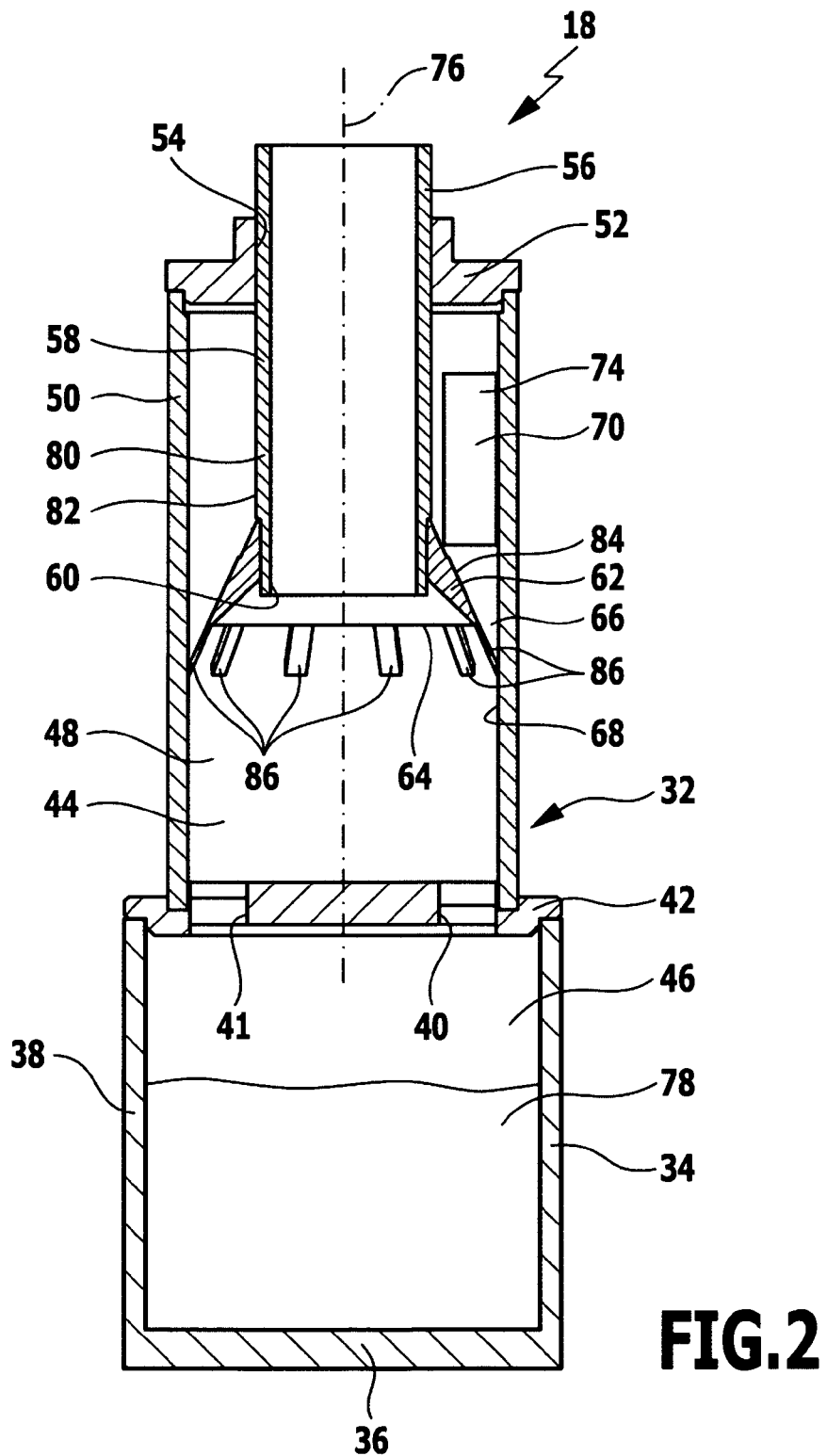
FIG. 2 shows a sectional view of the cyclone separator of the suction cleaning appliance from FIG. 1.

As is apparent, in particular, from FIG. 2, the preferred embodiment of the cyclone separator 18 in accordance with invention shown therein comprises a separating container 32 which has at the bottom a cup-shaped receptacle 34 of cylindrical cross section with a bottom wall 36 and a side wall 38. Owing to the position of the sectional plane, the receptacle 34 is hidden from sight in FIG. 1. An intermediate bottom 42 provided with through-openings 40, 41 is placed on the receptacle 34. The intermediate bottom 42 divides an interior 44 of the separating container 32 into a lower spatial area 46 enclosed by the receptacle 34 and an upper spatial area 48. The upper spatial area 48 is enclosed at the sides by a container wall 50 of cylindrical cross section, delimited at the bottom by the intermediate bottom 42 and at the top by a cover wall 52.

The cover wall 52 is placed on the container wall 50 and, therefore, forms at the same time a cover wall of the separating container 32. There is formed in the cover wall 52 a central opening 54 through which a pipe section 56 extending into the upper spatial area 48 passes in a positively locked manner. The pipe section 56 is connectable to the suction channel 16, so that the interior 44 can be subjected to negative pressure through the pipe section 56 and the suction channel 16. The pipe section 56, consequently, forms part of a suction extraction line 58, which forms an outlet 60 for suction air from the interior. The outlet 60 is formed at the end of the pipe section 56 that faces the intermediate bottom 42.

The suction extraction line 58 further comprises a shield 62. The shield 62 is fixed to the pipe section 56 in the area of its bottom end facing the intermediate bottom 42, for example, by clamping, locking or adhesive connection. It may, however, also be provided that the shield 62 is formed integrally with the pipe section 56. On its outside, the shield 62 has a frustoconical contour, with the outer circumference of the shield 62 widening in the direction of the intermediate bottom 42.

The shield 62 has a free rim 64 which faces the intermediate bottom 42 and at which the diameter of the shield 62 is greater than the outer diameter of the pipe section 56, but less than the inner diameter of the separating container 32 in the upper spatial area 48. A space 66 between the suction extraction line 58 and an inner wall 68 of the container wall 50 is minimal at the free rim 64 of the shield 62.

In a concrete implementation of the cyclone separator 18 in practice, it may be provided that the outer diameter of the pipe section 56 is approximately 40 millimeters, the diameter of the shield 62 at the free rim 64 approximately 60 millimeters, and the inner diameter of the upper spatial area 48 approximately 70 millimeters.

An inlet 70 for a mixture of dirty cleaning liquid and suction air is formed in the container wall 50 near the cover wall 52. A pipe section 72 (FIG. 1) extending in continuation of the connection element 20 opens into the interior 44 via the inlet 70, which forms a rectangular window 74. The pipe section 72 is formed tangentially on the container wall 50, so that the mixture of suction air and cleaning liquid can flow tangentially in relation to an axis 76 defined by the cyclone separator 18 into the interior 44. As a result, a cyclone forms in the separating container 32, specifically in the upper spatial area 48. The mixture of suction air and cleaning liquid flows in a circle between the suction extraction line 58 and the inner wall 68. The flow runs helically in the direction of the intermediate bottom 42 as the suction extraction line 58 extends into the upper spatial area 48 to such an extent that the outlet 60 is located below the inlet 70.

Owing to the twist effect of the cyclone in relation to the axis 76, cleaning liquid is centrifugally accelerated in such a way that the cleaning liquid is hurled against the inner wall 68. With the formation of a wall boundary layer flow, and under the influence of gravity, the cleaning liquid flows with the detached dirt along the inner wall 68 in the direction of the intermediate bottom 42. The cleaning liquid flows through the through-openings 40 and 41 into a cleaning liquid reservoir 78. The purpose of the intermediate bottom 42 is to keep foam formation in the lower spatial area 46 away from the upper spatial area 48. Foam is thereby prevented from being drawn off by suction through the outlet 60. The foam formation is due to the cleaning additive added to the cleaning liquid.

The purpose of the shield 62 is to increase the flow velocity of the mixture of suction air and cleaning liquid in the cyclone by reducing the space 66 between the suction extraction line 58 and the inner wall 68. The twist effect on the liquid droplets is thereby increased, so that these can be separated onto the inner wall 68 and delivered to the cleaning liquid reservoir 78 in an improved manner.

A wall 80 of the suction extraction line 58, which is formed by the wall of the pipe section 56 and the wall of the shield 62, forms a partition wall 82 surrounding the outlet 60 for shielding the outlet 60 from cleaning liquid drawn in by suction. The partition wall 82 partly prevents cleaning liquid drawn in by suction from being drawn by suction directly from the inlet 70 through the outlet 60 into the suction channel 16. In practice, however, there is the problem that cleaning liquid collects in the form of drops or a film on the partition wall 82. In particular, cleaning liquid collects on an upper side 84 of the shield 62 that faces the cover wall 52 and the inlet 70.

The accumulation of cleaning liquid on the partition wall 82 is due, for example, to a short circuit of the flow in the separating container 32 owing to back-up of the flow with a fluctuating charge of cleaning liquid or a fluctuating opening cross section of the connected floor nozzle, as a result of which the pressure conditions in the separating container 32 change. Furthermore, wall friction of the mixture of cleaning liquid and suction air results in a boundary layer flow, the so-called "lid boundary layer flow", which may form across the cover wall 52 up to the partition wall 82.

Under the action of the cyclone in the upper spatial area 48, cleaning liquid can flow on the upper side to the free rim 64. Without the transfer elements explained hereinbelow, this cleaning liquid can flow around the free rim 64 and in an undesired manner be drawn off by suction through the outlet 60.

Figure 3A:
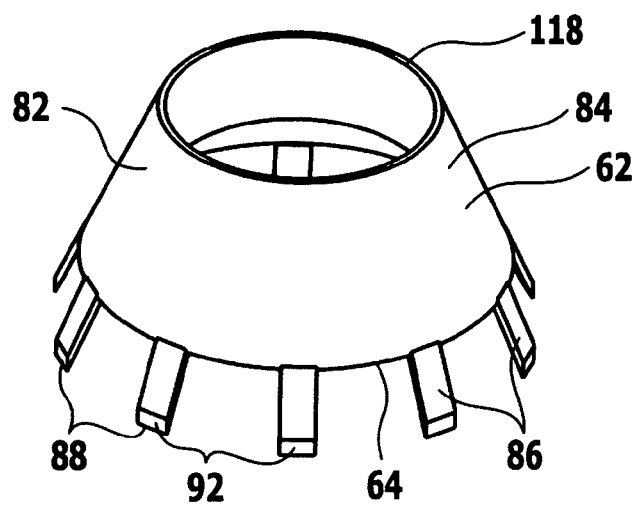
FIGS. 3A to 3C show a perspective representation of a shield with transfer elements of the cyclone separator from FIG. 2, a plan view of the shield and a sectional view along line 3C-3C in FIG. 3B.
Figure 3B:
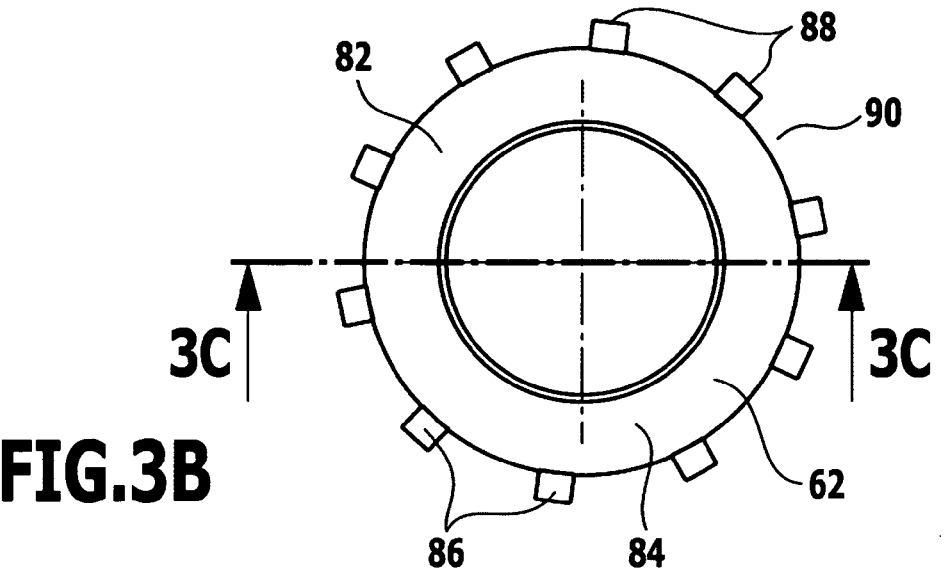
Figure 3C:
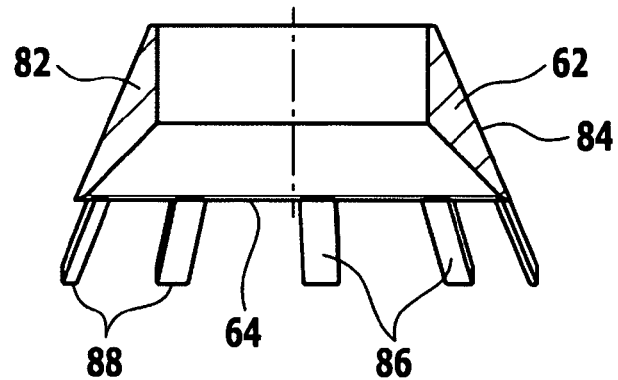

To prevent cleaning liquid from being drawn off by suction from the free rim 64 directly through the outlet 60, the cyclone separator 18 in accordance with the invention comprises a plurality of transfer elements 86, which will be discussed hereinbelow, in particular, with reference to FIGS. 2 to 3C. The shield 62 is shown together with the transfer elements 86 in each of FIGS. 3A to 3C.

The transfer elements 86 are configured as projections in the direction of the inner wall 68, which are fixed to the free rim 64. The transfer elements 86 may be formed integrally with the partition wall 82 on the shield 62 and, therefore, at least a part of the suction extraction line 58. For this purpose, the shield 62 is, for example, preferably made of a plastic material. With respect to their configuration, the transfer elements 86 are finger-shaped or strip-shaped, and they protrude from the free rim 64 in a straight-line extension of the upper side 84 (FIG. 3C). The transfer elements 86 are each spatially delimited in the circumferential direction of the partition wall 82 in relation to the axis 76 of the cyclone separator 18, more particularly, with their free ends 88 facing the inner wall 68, they each cover an angle of approximately 10°.

A total of ten transfer elements 86 of identical construction are provided. In the circumferential direction of the partition wall 82, they are uniformly spaced from one another, so that a space 90 covering approximately 30 angular degrees in relation to the axis 76 is located between each two adjacent transfer elements 86.

At their free ends 88, the transfer elements 86 have flat contact members 92 for contacting the inner wall 68. For, the length of the transfer elements 86 in the cyclone separator 18 is precisely of such dimensions that the transfer elements 86 completely bridge the space 66 from the free rim 64 to the inner wall 68.

The purpose of the transfer elements 86 is to conduct cleaning liquid adhering to the upper side 84 in a targeted manner to the inner wall 68 and feed it to the wall boundary layer flow. Since the transfer elements 86 contact the inner wall 68 via the contact members 92 in a surface-to-surface manner, the cleaning liquid can be conveyed particularly reliably to the inner wall 68. At the inner wall 68, the cleaning liquid can flow to the cleaning liquid reservoir 78.

Since a total of ten transfer elements 86 are provided, cleaning liquid can be largely prevented from being directly drawn off by suction from the free rim 64 through the outlet 60. Instead, droplets form in the area in which the transfer elements 86 are joined to the free rim 64 and can flow off via these. Cleaning liquid which as a result of the twist effect of the cyclone above the free rim 64 is separated onto the inner wall 68 can also flow to the cleaning liquid reservoir 78 through the spaces 90 which are of sufficiently large dimensions. In practice, it is found that with such a configuration of the shield 62 with transfer elements 86, even hair and fluff only get caught to a minor extent on the transfer elements 86.

As mentioned, the transfer elements 86 contact the inner wall 68 in the present case. In this way, they bridge the space 66 between the partition wall 82 and the inner wall 68 completely, so that there is no remaining space in the area of the transfer elements 86. The cleaning liquid can thereby be conducted particularly reliably to the inner wall 68.

In accordance with the invention, it is provided that the transfer elements 86 bridge the space 66 except for a maximum remaining space of 2 millimeters. It has been found in implementations of variants of the cyclone separator 18 in practice that when a remaining space of at maximum 2 millimeters is provided, cleaning liquid can still be effectively conducted to the inner wall 68 via the transfer elements 86. It is, however, of advantage if the remaining space is less than 2 millimeters, in particular, less than 1 millimeter, and even more preferred, less than 0.5 millimeters.

The provision of the transfer elements 86 in the cyclone separator 18 offers the advantage that even with its very compact construction, cleaning liquid can be prevented from being drawn in by suction from the partition wall 82 through the outlet 60. In particular, relatively large separating containers can be dispensed with. Accordingly, in an implementation of the cyclone separator 18 in practice, in the case of the above-mentioned diameter of the separating container 32 in the upper spatial area 48 of approximately 70 millimeters, the space 66 between the partition wall 82 and the inner wall 68 is approximately 3 to 4 millimeters. The entire cyclone separator 18, therefore, assumes such a small constructional volume that it is very well-suited for installation in portable suction cleaning appliances, as shown by the example of suction cleaning appliance 10.

Combinations of the shield 62 with transfer elements, denoted by reference numerals 94, 96, 98, 100 and 142, are referred to hereinbelow with reference to FIGS. 4A to 4C, 5A to 5C, 6A to 6C, 7A to 7C and 8A and 8B. The combinations 94, 96, 98 and 100 each comprise the shield 62 and may be used in a variant of the cyclone separator 18 instead of the combination of the shield 62 with the transfer elements 86 in accordance with FIGS. 3A to 3C. The combination 142 comprises a variant of the shield 62 denoted by reference numeral 144 and may also be used in a variant of the cyclone separator 18. Features of the shields 62 and 144 which are the same or have the same effect are denoted by the same reference numerals.

Ten transfer elements are provided in each of the combinations 94, 96, 98 and 100, five in the combination 142. They are each identical in construction and are each uniformly spaced from one another in the circumferential direction of the partition wall 82 in relation to the axis 76. In the circumferential direction of the partition wall 82, they each cover, in the same way as the transfer elements 86 at their free ends 88 facing the inner wall 68, an angle of approximately 10°. At their free ends 88 facing the inner wall 68, they each have flat contact members 92 for contacting the inner wall 68. They are each of such length that they contact the inner wall 68, and they each extend as an extension of the shield 62.

Figure 4A:
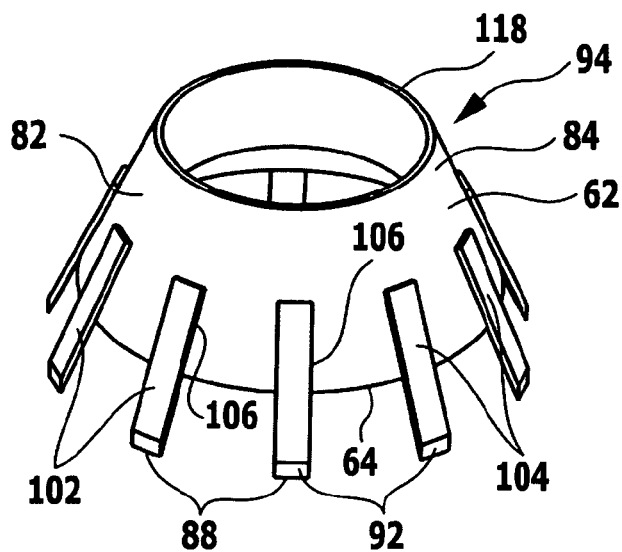
FIGS. 4A to 7C show variants of the shield with transfer elements in accordance with FIGS. 3A to 3C of the cyclone separator from FIG. 2, more particularly, in a perspective representation, a plan view and a sectional representation, in each case.
Figure 4B:
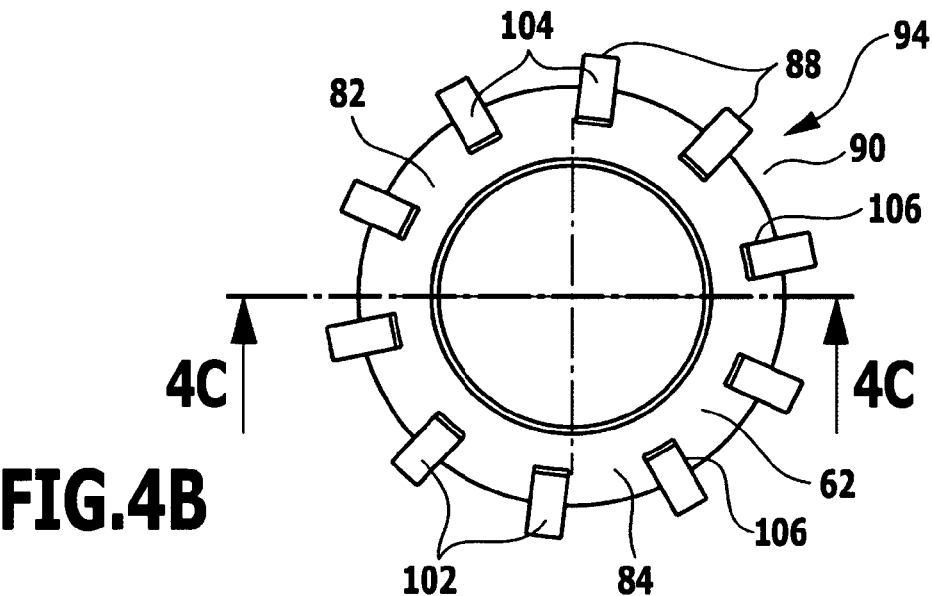
Figure 4C:
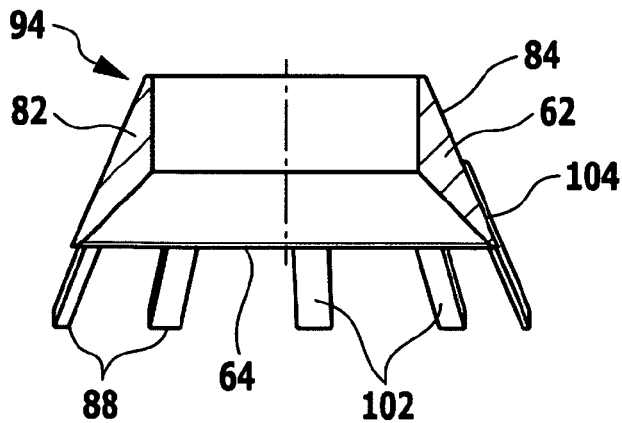

In the combination 94 in accordance with FIGS. 4A to 4C, transfer elements 102 are provided, which with their end facing the shield 62 are arranged on the upper side 84 thereof. The transfer elements 102, therefore, project beyond the frustoconical surface defined by the upper side 84 and form ribs 104. The transfer elements 102 may be formed integrally with the shield 62. They may, however, also be formed separately from it and be fixed, for example, adhesively to the shield 62.

Owing to the rib-shaped configuration of the transfer elements 102, an edge 106 is formed in each case on each transfer element 102 on the upper side 84. Cleaning liquid adhering to the upper side 84 can accumulate in an improved manner under the twist effect at the edges 106, i.e., the edge 106 acts, as it were, as "impact edge" for the cleaning liquid. This allows the cleaning liquid to be conducted particularly reliably from the shield 62 to the inner wall 68.

Whereas the transfer elements 86 and 102 are each of straight-lined configuration, the transfer elements of the combinations 96, 98, 100 described hereinbelow are each of curved configuration in the direction of flow of the cyclone or protrude at an incline from the free rim 64 in the direction of flow of the cyclone. Since cleaning liquid droplets which are conducted from the shield 62 to the inner wall 68 via the transfer elements are each subjected to the twist effect of the cyclone, in the case of the transfer elements described hereinbelow the risk of cleaning liquid droplets becoming detached from the transfer elements under the twist effect can be reduced.

Figure 5A:
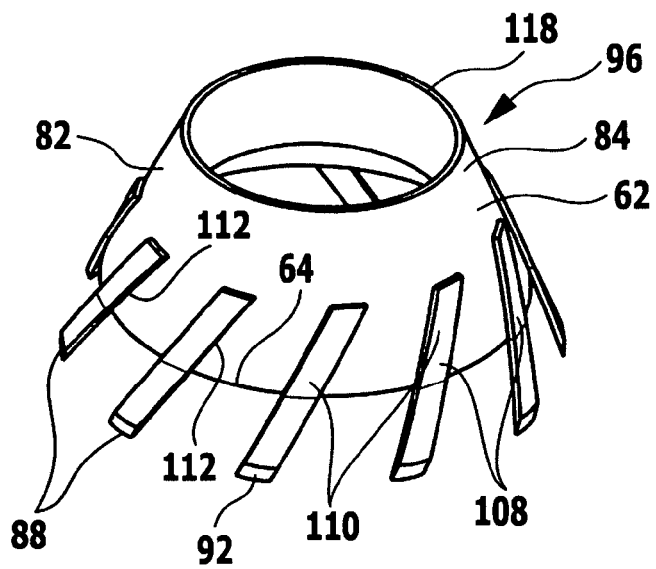
Figure 5B:
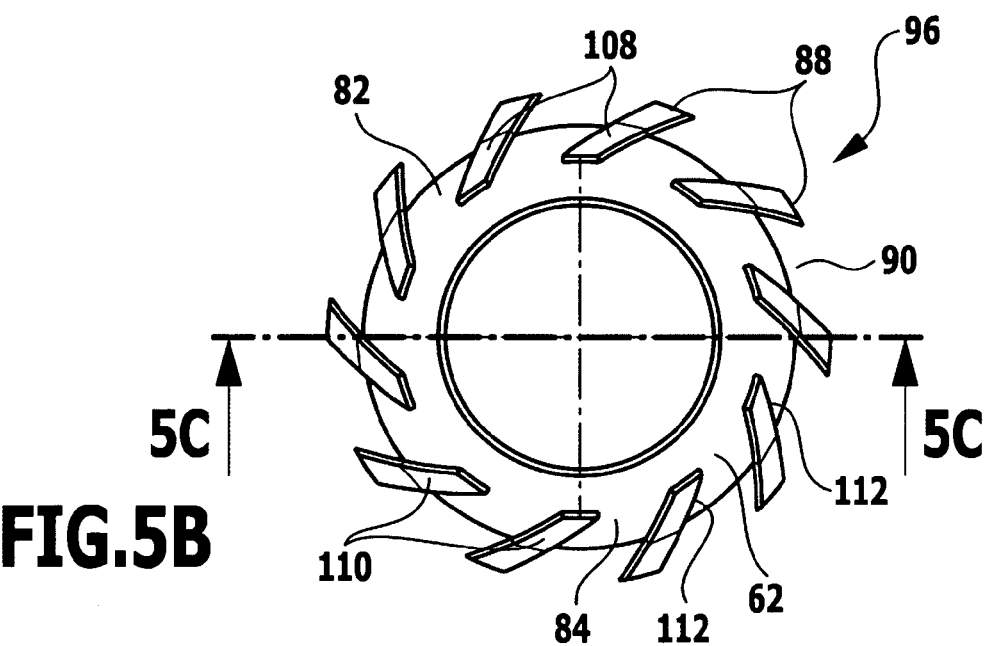
Figure 5C:
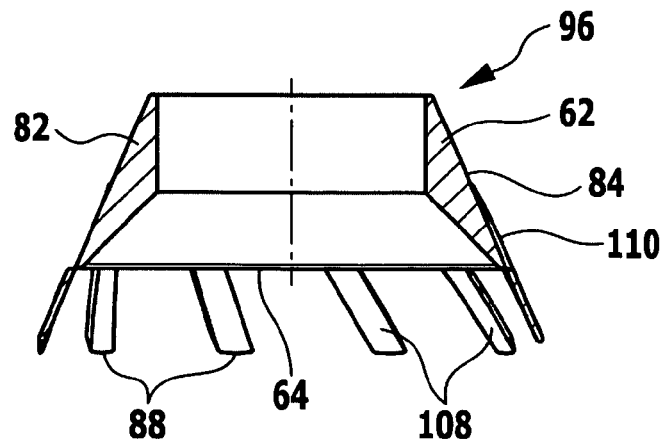

For example, the combination 96 in accordance with FIGS. 5A to 5C comprises transfer elements 108 which, like the transfer elements 102, form ribs 110 which are raised above the upper side 84. Consequently, the ribs 110 form edges 112 for collecting cleaning liquid droplets, which correspond in the way they function to the edges 106 of the transfer elements 102, so that reference may be had in this connection to the above explanations.

Figure 6A:
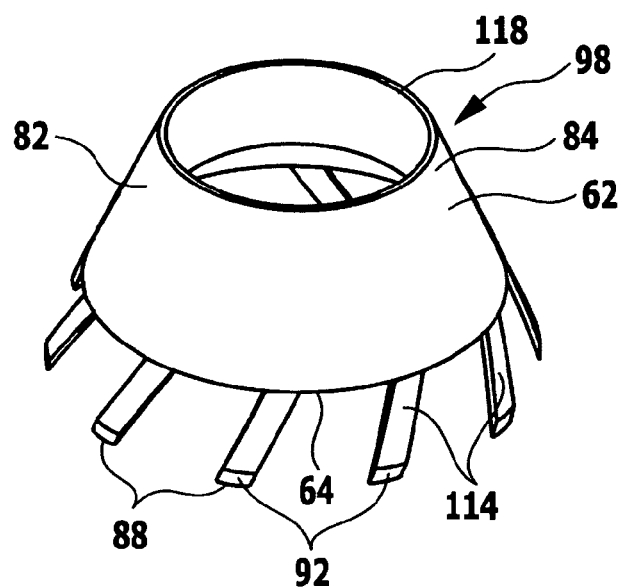
Figure 6B:
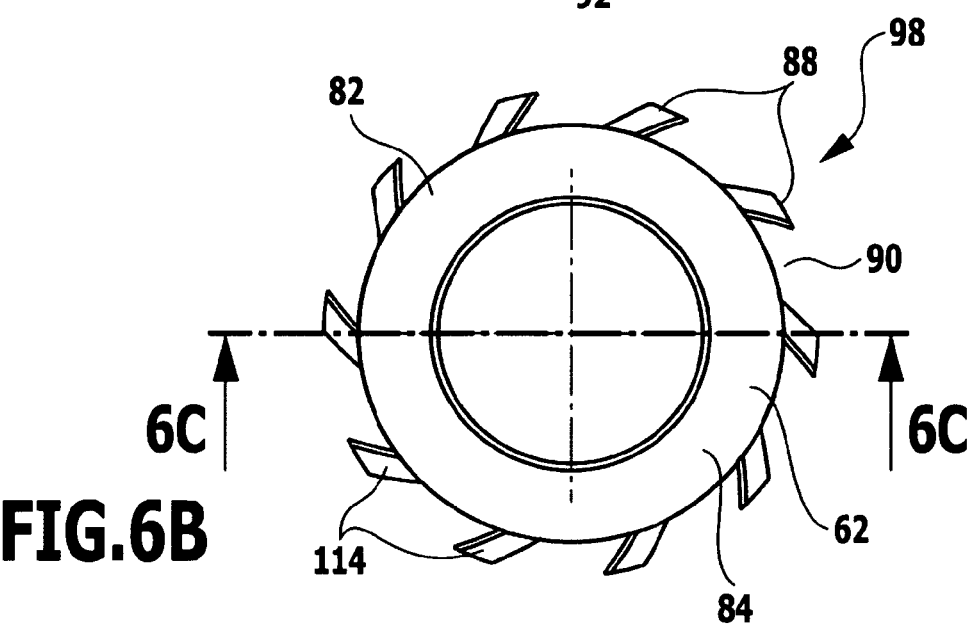
Figure 6C:
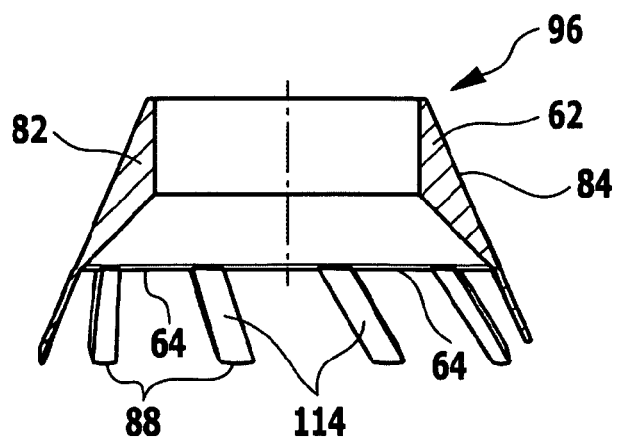

In the combination 98 in accordance with FIGS. 6A to 6C, transfer elements 114 are provided, which like the transfer elements 86 are fixed to the free rim 64 and protrude from it in the direction of the inner wall 68. Furthermore, the upper side 84 in the combination 98 is of the same planar configuration as the upper side 84 in the combination in accordance with FIGS. 3A to 3C, which was described first.

Figure 7A:
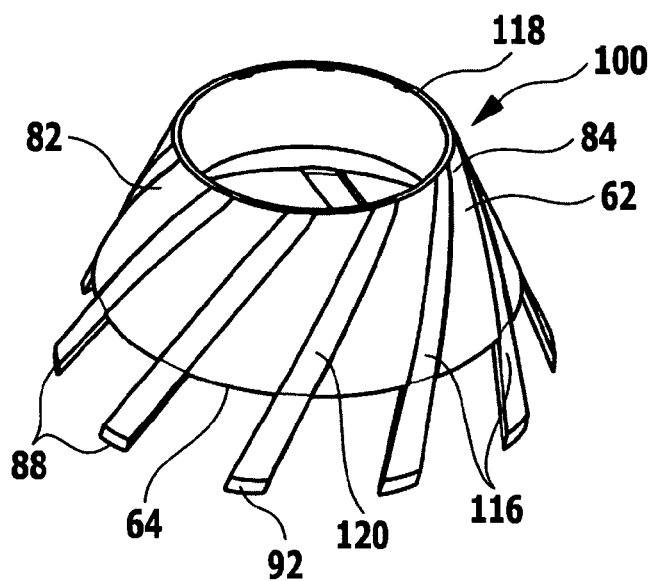
Figure 7B:
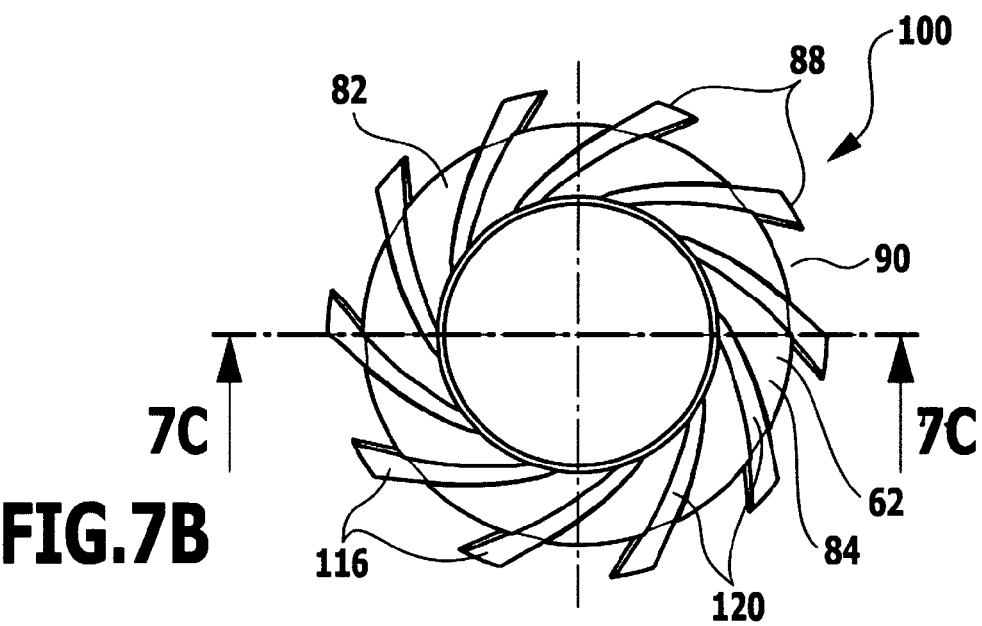
Figure 7C:
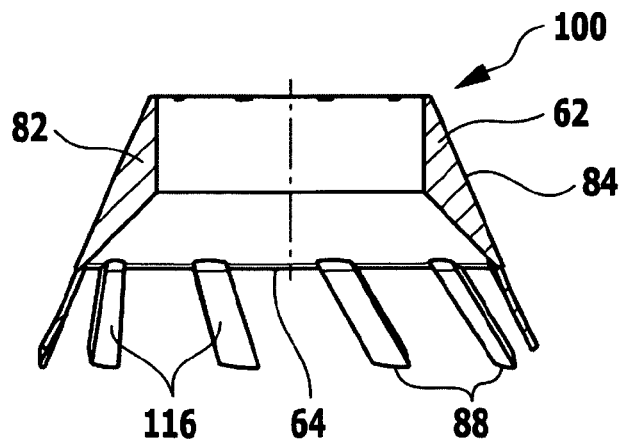

In the combination 100 in accordance with FIGS. 7A to 7C, transfer elements 116 are provided, which, starting from an upper rim 118 of the shield 62, extend spirally in the direction of the inner wall 68. The transfer elements 116 are formed in the partition wall 82, and they form grooves 120 extending in the longitudinal direction. The grooves 120 form depressions in the upper side 84 of the shield 62 and extend up to the free ends 88 of the transfer elements 116. Cleaning liquid can be collected in the grooves 120 on the upper side 84 of the shield 62 and be conducted particularly effectively to the inner wall 168 as the transfer elements 116 form, as it were, channels.

In the further combinations of shield and transfer elements in accordance with FIGS. 3A to 3C, 4A to 4C, 5A to 5C, 6A to 6C and 8A and 8B, too, it may be provided that the respective transfer elements comprise grooves and/or that grooves are formed on the upper side 84 of the shield 62 and 144, respectively.

Figure 8A:
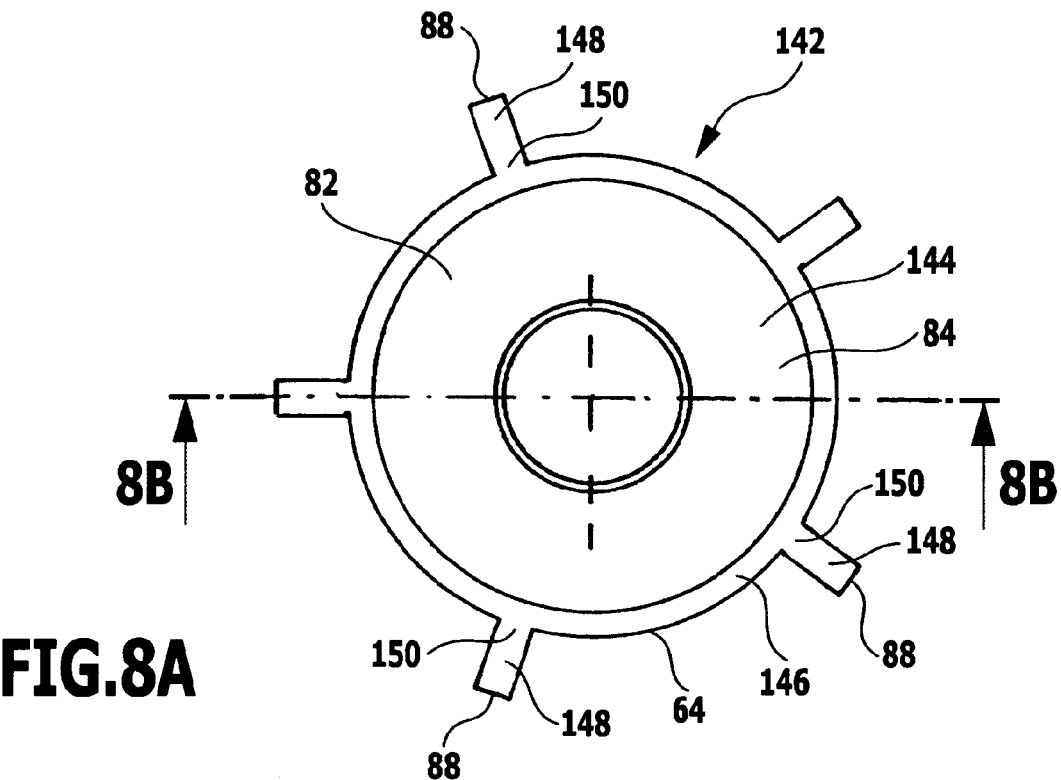
FIGS. 8A and 8B show a further variant of the shield with transfer elements in accordance with FIGS. 3B and 3C of the cyclone separator from FIG. 2 in a plan view and a sectional representation.
Figure 8B:
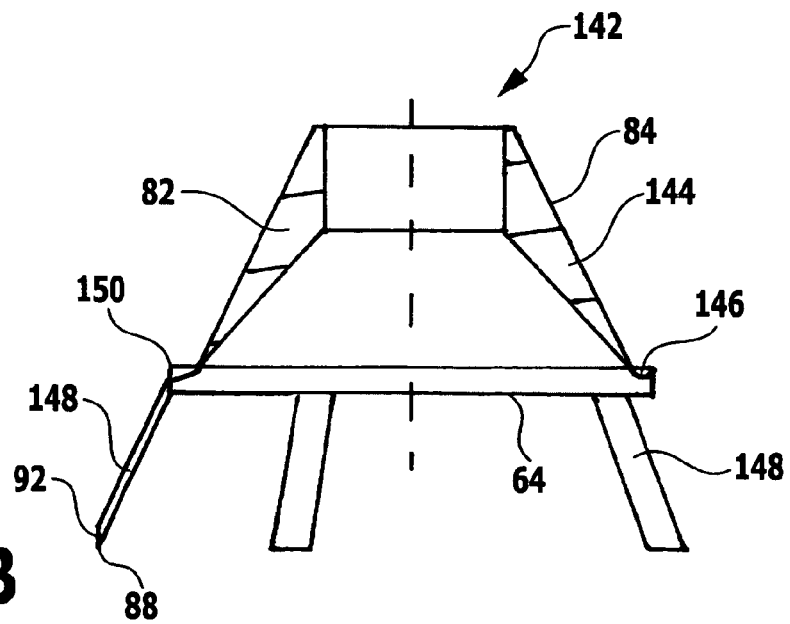

The shield 144 of the combination 142 in FIGS. 8A and 8B is of integral configuration, and it comprises at the free rim 64 a groove 146 extending at least partially and, in particular, fully in the circumferential direction. Transfer elements 148 protrude from the groove 146 in the direction of the inner wall 68. At the point where each of the transfer elements 148 joins the groove 146, a lateral recess 150 is formed on the shield 144. Cleaning liquid which has collected in the groove 146 can be conducted at the recesses 150 in a targeted manner to the transfer elements 148 and conveyed via these to the wall boundary layer flow.

It may be provided that a groove extending at least partially in the circumferential direction is provided at the free rim 64 in the combinations of shield 62 with the respective transfer elements in accordance with FIGS. 3A to 7C, too.

Figure 9:
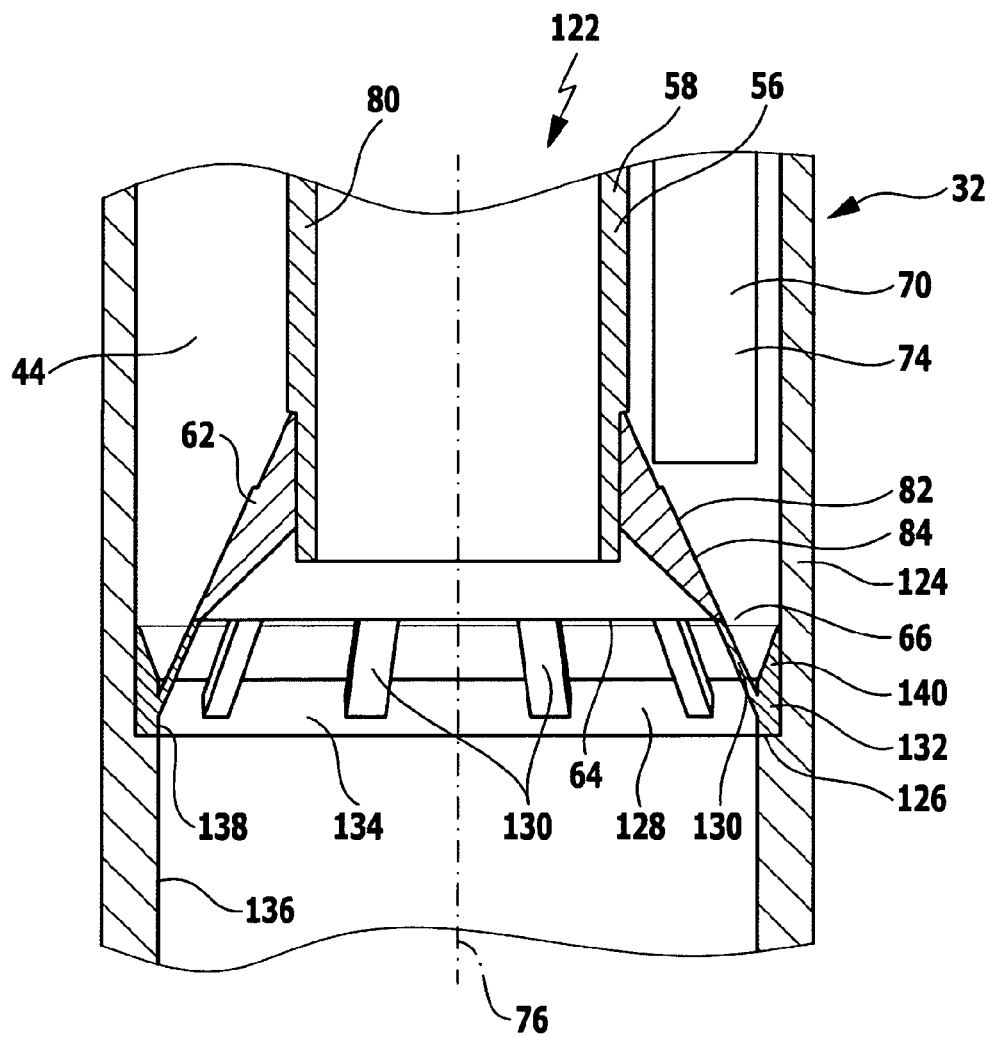
FIG. 9 shows a sectional view, shown in part, of a second preferred embodiment of a cyclone separator in accordance with the invention.

In a second preferred embodiment of a cyclone separator 122 in accordance with the invention, a section of which is shown in FIG. 9, features or components which are the same or function in the same way as features or components of the cyclone separator 18 are denoted by the same reference numerals. The advantages achievable with the cyclone separator 18 are also achievable with the cyclone separator 122.

Differently from the cyclone separator 18, the cyclone separator 122 comprises instead of the container wall 50 a container wall 124, which has on the inside below the free rim 64 a ring-shaped, stepped abutment element 126. The abutment element 126 forms an annular shoulder on which a holder 128 for transfer elements 130 can be releasably fitted.

The holder 128 comprises a holding ring 132. On the side facing the axis 76, the holder 128 has a wall 134 which in the area of the holding ring 132 is in alignment with an inside wall 136 of the container wall 124. The wall 134 of the holder 128 thereby forms a section of an inner wall 138 of the separating container 32 of the cyclone separator 122, which is otherwise formed by the inside wall 136.

Facing the cover wall 52, the holder 128 has a transfer section 140 formed on the holding ring 132. In the area of the transfer section 140, the wall 134 of the holder 128 extends towards the section of the inside wall 136 of the container wall 124 that is arranged above the abutment element 126. Above the step-shaped abutment element 126, the inside wall 136 is radially outwardly offset in relation to the axis of rotation 76 in comparison with its position below the abutment element 126. For example, the transfer section 140 has the contour of a paraboloid of revolution in relation to the axis 76.

The transfer section 140 ensures that the formation of the cyclone and the wall boundary layer flow are not affected by the holding ring 132, and cleaning liquid can be conducted in an improved manner from above the holding ring 132 to the cleaning liquid reservoir 78.

The transfer elements 130, which are integrally formed with the holder 128, protrude from the wall 134 in the direction of the free rim 64. Again the elements are ten in number and identical in configuration and are uniformly spaced from one another in the circumferential direction of the axis 76. The space 66 between the partition wall 82 and the inner wall 138 is completely bridged by the transfer elements 130 which contact the free rim 64 with their free ends 88. This allows cleaning liquid to be conducted from the upper side 84 via the transfer elements 130 to the inner wall 138.

In the cyclone separator 122, too, it may be provided that a remaining space between the free ends of the transfer elements 130 and the shield 62 is at maximum 2 millimeters. With such a remaining space it is found in practice that cleaning liquid can still be conducted from the upper side 84 via the transfer elements 130 and conveyed to the wall boundary layer flow.

With the cyclone separator 122, it is possible to remove the holder 128 from the interior 44. This allows the transfer elements 130 to be freed from dirt in a user friendly manner. After the cleaning operation, the holder 128 can be placed in the separating container 32 again and the suction extraction line 58 with shield 62 then inserted in the interior 44. These maneuvers can be carried out quickly and easily and so the cyclone separator is also easy to handle when initially installed.

That which is claimed:

1. A cyclone separator for a suction cleaning appliance, in particular, for a spray extraction appliance or a wet vacuum cleaner, said cyclone separator comprising a separating container for separating cleaning liquid drawn in by suction, with an inlet through which suction air and cleaning liquid can be drawn by suction into an interior of the separating container, thereby forming a cyclone, a suction extraction line extending into the interior and connectable to a suction unit, with an outlet through which suction air can be drawn out of the interior, and a partition wall shielding the outlet from cleaning liquid, a space being provided between an inner wall of the separating container and the partition wall, wherein said cyclone separator comprises at least one transfer element arranged between the partition wall and the inner wall for transferring cleaning liquid from the partition wall to the inner wall, said transfer element bridging the space between the partition wall and the inner wall except for a maximum remaining space of 2 millimeters.

2. The cyclone separator in accordance with claim 1, wherein the partition wall is a wall of the suction extraction line.

3. The cyclone separator in accordance with claim 1, wherein the at least one transfer element bridges the space except for a remaining space of less than 2 millimeters.

4. The cyclone separator in accordance with claim 1, wherein the at least one transfer element bridges the space completely.

5. The cyclone separator in accordance with claim 1, wherein the at least one transfer element comprises at least one contact member for contacting at least one of the partition wall and the inner wall.

6. The cyclone separator in accordance with claim 1, wherein the at least one transfer element is of strip-shaped configuration.

7. The cyclone separator in accordance with claim 1, wherein the at least one transfer element is of straight-lined configuration.

8. The cyclone separator in accordance with claim 1, wherein the at least one transfer element has a curvature in the direction of flow of the cyclone.

9. The cyclone separator in accordance with claim 1, wherein the at least one transfer element comprises at least one groove.

10. The cyclone separator in accordance with claim 1, wherein the cyclone separator comprises a plurality of transfer elements.

11. The cyclone separator in accordance with claim 10, wherein the transfer elements are of identical configuration.

12. The cyclone separator in accordance with claim 10, wherein the transfer elements are uniformly spaced from one another in the circumferential direction of the partition wall.

13. The cyclone separator in accordance with claim 1, wherein the at least one transfer element is fixed to the partition wall.

14. The cyclone separator in accordance with claim 13, wherein the at least one transfer element is formed integrally with the partition wall or a part thereof.

15. The cyclone separator in accordance with claim 13, wherein the at least one transfer element is fixed to a free rim of the partition wall.

16. The cyclone separator in accordance with claim 1, wherein the partition wall comprises or forms a shield which widens in its circumference in the direction in which the suction extraction line extends into the interior.

17. The cyclone separator in accordance with claim 16, wherein the at least one transfer element is configured so as to extend as an extension of the shield in the direction of the inner wall.

18. The cyclone separator in accordance with claim 16, wherein the at least one transfer element is arranged on a side of the shield that faces the inlet.

19. The cyclone separator in accordance with claim 1, wherein the at least one transfer element is fixed to the inner wall.

20. The cyclone separator in accordance with claim 19, wherein the at least one transfer element is formed integrally with the inner wall.

21. The cyclone separator in accordance with claim 19, said cyclone separator comprising a holder for the at least one transfer element, the holder forming a section of the inner wall and being releasably insertable into the separating container.

22. The cyclone separator in accordance with claim 21, wherein the at least one transfer element is formed integrally with the holder.

23. A suction cleaning appliance, comprising at least one cyclone separator comprising a separating container for separating cleaning liquid drawn in by suction, with an inlet through which suction air and cleaning liquid can be drawn by suction into an interior of the separating container, thereby forming a cyclone, a suction extraction line extending into the interior and connectable to a suction unit, with an outlet through which suction air can be drawn out of the interior, and a partition wall shielding the outlet from cleaning liquid, a space being provided between an inner wall of the separating container and the partition wall, and said cyclone separator comprising at least one transfer element arranged between the partition wall and the inner wall for transferring cleaning liquid from the partition wall to the inner wall, said transfer element bridging the space between the partition wall and the inner wall except for a maximum remaining space of 2 millimeters.

* * * * *